(12) United States Patent
Sepe, Jr. et al.

(10) Patent No.: US 10,978,976 B2
(45) Date of Patent: Apr. 13, 2021

(54) ELECTRIC MOTOR CURRENT CONTROLLER WITH NEGATIVE SEQUENCE HARMONIC SUPPRESSION

(71) Applicant: ELECTRO STANDARDS LABORATORIES, Cranston, RI (US)

(72) Inventors: Raymond B Sepe, Jr., Medfield, MA (US); Steven Bastien, Exeter, RI (US)

(73) Assignee: Electro Standards Laboratories, Cranston, RI (US)

( * ) Notice: Subject to any disclaimer, the term of this patent is extended or adjusted under 35 U.S.C. 154(b) by 0 days.

(21) Appl. No.: 16/505,406

(22) Filed: Jul. 8, 2019

(65) Prior Publication Data

US 2019/0334462 A1 Oct. 31, 2019

Related U.S. Application Data

(62) Division of application No. 14/825,712, filed on Aug. 13, 2015, now Pat. No. 10,348,229.

(60) Provisional application No. 62/043,996, filed on Aug. 29, 2014.

(51) Int. Cl.
*H02M 1/42* (2007.01)
*H02P 21/00* (2016.01)
*H02P 29/50* (2016.01)

(52) U.S. Cl.
CPC ...... *H02P 21/0003* (2013.01); *H02P 21/0085* (2013.01); *H02P 29/50* (2016.02)

(58) Field of Classification Search
CPC .. H02P 21/0003; H02P 29/50; H02P 21/0085; H02M 1/4208
See application file for complete search history.

(56) References Cited

U.S. PATENT DOCUMENTS

| | | | |
|---|---|---|---|
| 4,245,955 A | 1/1981 | Lambertson | |
| 5,042,965 A | 8/1991 | Niessen | |
| 5,513,090 A * | 4/1996 | Bhattacharya | H02J 3/24 363/40 |
| 6,972,534 B1 | 12/2005 | Schulz et al. | |
| 7,969,103 B2 | 6/2011 | Sepe, Jr. | |
| 2004/0204776 A1 | 10/2004 | Sri-Jayantha et al. | |
| 2009/0085354 A1 | 4/2009 | Tan | |
| 2009/0251096 A1 | 10/2009 | Schulz | |
| 2011/0134669 A1 | 6/2011 | Yuzurihara | |

(Continued)

FOREIGN PATENT DOCUMENTS

JP 2012165610 A 8/2012

OTHER PUBLICATIONS

Krause, "Method of Multiple Reference Frames Applied to the Analysis of Symmetrical Induction Machinery," IEEE Transactions on Power Apparatus and Systems, vol. PAS-87(1), Jan. 1968, pp. 218-227.

(Continued)

*Primary Examiner* — Cortez M Cook
(74) *Attorney, Agent, or Firm* — IP Authority, LLC; Ramraj Soundararajan

(57) ABSTRACT

A current controller is provided having a positive sequence controller and at least one negative sequence controller, where one or more error signals operated on by the positive sequence controller are transformed into at least one sequence reference frame and input to the at least one negative sequence controller with at least one targeted harmonic set by a harmonic factor value.

21 Claims, 4 Drawing Sheets

(56) References Cited

U.S. PATENT DOCUMENTS

2012/0212191 A1\* 8/2012 Yuzurihara ......... H02M 1/4208
 323/205
2013/0082636 A1 4/2013 Ohori

OTHER PUBLICATIONS

Xiao et al., "Multiple Reference Frame-Based Control of Three-Phase PWM Boost Rectifiers under Unbalanced and Distorted Input Conditions," IEEE Transactions on Power Electronics, 23(4), Jul. 2008, pp. 2006-2017.

\* cited by examiner

ELECTRIC MOTOR CURRENT CONTROLLER WITH NEGATIVE SEQUENCE HARMONIC SUPPRESSION

RELATED APPLICATIONS

This application is a divisional of U.S. application Ser. No. 14/825,712 filed Aug. 13, 2015, which claims the benefit of U.S. Ser. No. 62/043,996 filed Aug. 29, 2014.

BACKGROUND OF THE INVENTION

Field of Invention

The present invention relates generally to the field of current controllers. More specifically, the present invention is related to a novel design for electric motor current controller with negative sequence harmonic suppression.

Discussion of Related Art

The paper to P. C. Kraus titled "Method of Multiple Reference Frames Applied to the Analysis of Symmetrical Induction Machinery" discusses the mathematics and physical implementation of using multiple reference frames for control of motors.

The paper to P. Xiao titled "Multiple Reference Frame-based Control of Three-Phase PWM Boost Rectifiers under Unbalanced and Distorted Input Conditions" discusses implementation of multiple reference frames for control. However, Xiao's implementation is based on straightforward application of the fundamental ideas in the above-referenced paper to Kraus.

The U.S. patent to Sepe, Jr. (U.S. Pat. No. 7,969,103), also assigned to Electro Standards Laboratories, discloses the use of delay state feedback to enhance performance over a wide speed range for electric motors.

Embodiments of the present invention are an improvement over prior art systems and methods.

SUMMARY OF THE INVENTION

In one embodiment, the present invention discloses a current controller comprising: a positive sequence controller; and at least one negative sequence controller, where one or more error signals operated on by the positive sequence controller are transformed into at least one sequence reference frame and input to the at least one negative sequence controller with at least one targeted harmonic set by a harmonic factor value.

In another embodiment, the present invention provides a current controller comprising: a positive sequence controller, at least one negative sequence controller, and a rotational transformer, where the rotational transformer transforms one or more error signals operated on by the positive sequence controller into at least one sequence reference frame for input to the at least one negative sequence controller with at least one targeted harmonic set by a harmonic factor value.

In yet another embodiment, the present invention provides a current controller comprising: a positive sequence controller, at least one negative sequence controller, and a rotational transformer, wherein one or more error signals computed by taking a difference between measured and commanded currents are shared between the positive sequence controller and the at least one negative sequence controller, and wherein the rotational transformer transforms the one or more error signals operated on by the positive sequence controller into at least one sequence reference frame for input to the at least one negative sequence controller with at least one targeted harmonic set by a harmonic factor value.

In yet another embodiment, the present invention provide a current controller for a motor, the motor is any of the following: a linear and rotary electric motor or an induction motor, the current controller comprising: a positive sequence controller; at least one negative sequence controller; a rotational transformer; and one or more cross coupled gains between a d-axis and a q-axis, the cross coupled gains proportional to speed of the motor; wherein one or more error signals computed by taking a difference between measured and commanded currents are shared between the positive sequence controller and the at least one negative sequence controller, and wherein the rotational transformer transforms the one or more error signals operated on by the positive sequence controller into at least one sequence reference frame for input to the at least one negative sequence controller with at least one targeted harmonic set by a harmonic factor value.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1A:
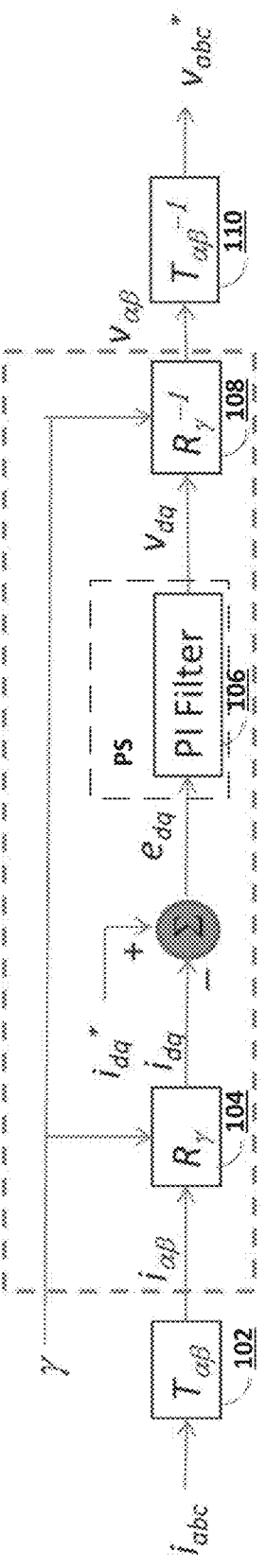
FIG. 1A depicts a standard control approach, without negative sequence rejection.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

This present invention describes a design for the negative sequence proportional integral (NS/PI) current control system for linear and rotary electric motors, and by extension to electric power systems, with the discussion here applied to induction motors. The controllers developed here have advanced features, to be described, which provide many advantages over the typical proportion-integral (PI) controllers and over other controllers with negative sequence harmonic suppression. Particularly, the inclusion of a novel negative sequence suppressor based on the transformed positive sequence current $i_{dq}$ error signals to cancel harmonics induced by line imbalance is a key advantage. The use of the shared $i_{dq}$ error signal in this approach allows the positive and negative sequence controllers to operate with minimal interference with each other so that additional filtering to isolate the positive and negative sequence components is not required and thus does not limit controller bandwidth. In addition to providing both positive sequence control and negative sequence suppression control, the controller developed here has extended bandwidth via additional feedback paths and feedback states that are not found in other controllers with negative sequence harmonic injection, and is able to operate over a very broad mechanical speed range, and also works well at relatively high electrical frequencies.

The inclusion of negative sequence control generally alters the frequency response characteristics of a current controller at high frequency and causes reduced gain and phase margins when operating the motor at high speed. In order to allow for greater design flexibility to combat this issue, the NS/PI control modifies the usual industrial approaches and allows cross coupling gains between the d-axis and q-axis current controllers. A design analysis over the full required speed range of the motor indicates that more robust performance is provided with cross coupled gains that are proportional to motor speed, and the existence of any control loop delays, which are normally detrimental to control stability, is dealt with by the innovative inclusion of delay state feedback to provide high bandwidth, low overshoot, small rise time and good stability margins. The net result is a controller with 8 or more (2 more needed for every loop delay in a given system) unique gains, used symmetrically on each of the 2 axes, with half of those gains (the cross coupled ones) changing linearly with motor speed.

This controller is more complex to implement than a standard uncoupled PI controller. Fortunately, the use of cross coupled gains (even speed dependent gains) is straightforward to implement digitally in software. The resulting code simply allows more terms than a typical PI controller for calculating the d-axis and q-axis voltage commands. This means a few more multiply and addition operations are required. One complication with establishing the controller design is calculating the required gains. With 8 or more unique numbers to determine, manual tuning is not practical, being unduly tedious or even impossible in practice. Hence, a pole placement method can be used to directly calculate the required gains, and pole locations are selected based on design criteria. The method of calculating gains via this methodology is not shown here, but standard textbooks on modern control theory describe this known method.

This design is applied for controlling induction motors with imbalanced phases caused by cabling connections, or other reasons, in industrial environments and shipboard use, especially when the induction motors must provide very fast and accurate control with high bandwidth and good stability margins. However, the installation of such a system requires long power cables which can create line imbalance, resulting in high torque ripple from negative sequence harmonics. Suppression of the torque ripple is problematic with standard control methods because any controller that targets the harmonics requires high frequency operations and this tends to destabilize standard current control topologies, unless the dynamic performance of the control system is reduced to prevent instability. Hence, this disclosed design provides a way to overcome all of these issues and provide a higher bandwidth, and better overall control, even with the added negative sequence suppression feature included.

The method described here, to suppress the negative sequence harmonic caused by imbalance, can be extended to suppress any other positive or negative sequence harmonic, either individually, or collectively. For example, if inverter harmonics introduce undesirable harmonics, then those particular harmonics can be removed by the same basic method.

Controller Design

The controller design is applied in the well-known dqo-axes rotor reference frame. When motor coils share a common neutral point connection, the 0-axis reference frame is not needed in the control design. Here the design is performed in the dq-axes reference frame but is applicable to the dq0-axes reference frame without loss of generality.

FIG. 1A depicts a standard control approach, without negative sequence rejection. The input 3-phase measured currents $i_{abc}$ are transformed to the stationary 2-phase frame currents $i_{\alpha\beta}$ via the $T_{\alpha\beta}$ transform block 102. The stationary frame currents are then transformed to the rotating frame $i_{dq}$ currents via the rotation transform $R_\gamma$ 104. The error signal vector $e_{dq}$ is generated by taking the difference between the measured currents and the commanded currents. The error vector signal is fed through the PI filter 106 to generate a rotating frame voltage command $v_{dq}$, and then the reverse transforms (generated by $R\gamma^{-1}$ transform block 108 and $T_{\alpha\beta}^{-1}$ transform block 110) are used to generate stationary frame voltage commands.

Figure 1B:
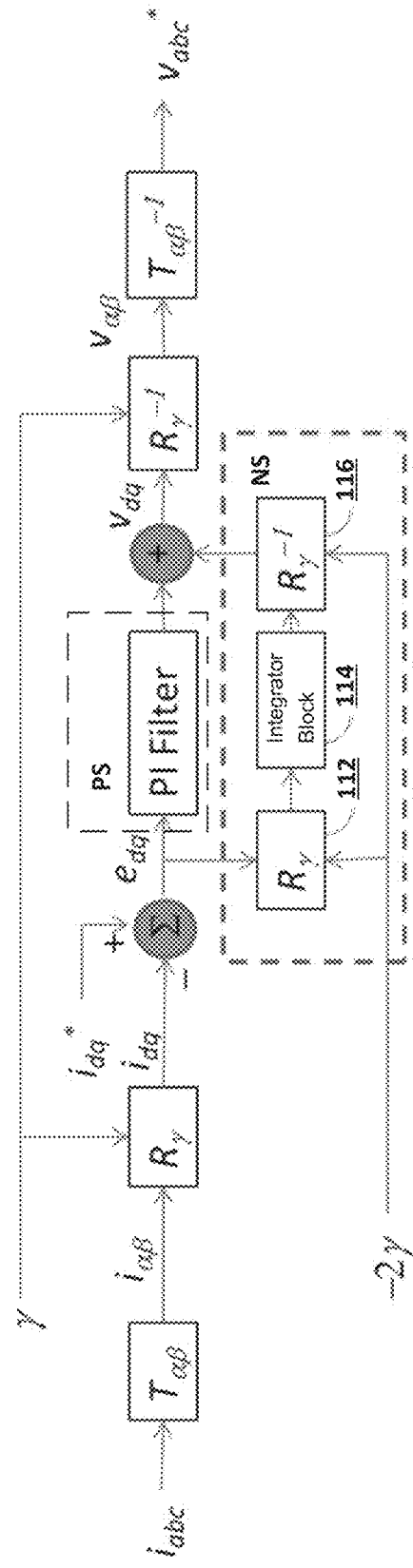
FIG. 1B depicts one embodiment of the present invention's negative sequence rejection by operating on an existing error signal.

FIG. 1B depicts one embodiment of the present invention's negative sequence rejection by operating on an existing error signal. The modification is to transform the error signal using a rotation transform at −2 (which is the harmonic factor) times the transform angle. Using the rotation transform $R_\gamma$ 112 but with angle −2γ as input as shown within the dotted box in FIG. 1, effectively creates a reference frame that is synchronized with the negative sequence harmonic. The integrator block (G/S) 114 is then applied to the transformed error signal and the result is transformed back into the dq synchronous frame via inverse rotational transformation block $R_\gamma^{-1}$ 116, and that signal is added back to the PI filter output to form the $v_{dq}$ voltage command.

Other implementations of negative sequence harmonic suppression controllers develop a separate error signal for the negative sequence portion of the control system. An innovation here (as shown in FIG. 1B) is that the standard error signal $e_{dq}$ used by the standard positive sequence controller is transformed into the negative sequence reference frame and is also used there. Because both the positive and negative sequence controllers share the same error signal $e_{dq}$, undesirable interaction between them is minimized and special filters to separate the negative sequence current components from the positive sequence current components are not needed. This allows for increased controller bandwidth because additional filtering can introduce delays. The sharing of the error signal can be done for any harmonic factor β. Without loss of generality, the example discussed here has β=−2 for the negative sequence harmonic caused by phase imbalance, but any factor can be used. It is also possible to dynamically change β if desired. Transform blocks are showing the matrix operator transforms that operate on the signal vectors. Most of the required math is evident from the diagram. The PI Filter is a gain term added to an amplified integration term and the G/s block is an amplified integration block. Operator transforms are as follows.

$$R_\gamma(\gamma) = \begin{bmatrix} \cos\gamma & \sin\gamma \\ -\sin\gamma & \cos\gamma \end{bmatrix}, R_\gamma^{-1}(\gamma) = \begin{bmatrix} \cos\gamma & -\sin\gamma \\ \sin\gamma & \cos\gamma \end{bmatrix}$$

$$T_{\alpha\beta} = \begin{bmatrix} 0 & \frac{-\sqrt{3}}{3} & \frac{\sqrt{3}}{3} \\ 0 & -1 & -1 \end{bmatrix}, T_{\alpha\beta}^{-1} = \begin{bmatrix} 0 & 1 \\ \frac{-\sqrt{3}}{2} & \frac{-1}{2} \\ \frac{\sqrt{3}}{2} & \frac{-1}{2} \end{bmatrix}$$

FIG. 1A shows the standard PI filter approach typically used for motor control, on the top block diagram. The bottom block diagram, FIG. 1B, shows the modification (with dotted lines) that is added to provide the negative sequence control function. Note the innovation shown in the diagram is that the second controller operates on the existing error signal $e_{dq}$ which is different from other approaches. This has the advantage of simple implementation and automatic prevention of conflict between the two controllers since both controllers try to zero out the error signal. The approach is scalable such that multiple NS Controller Subsystems can be paralleled, with $e_{dq}$ used as input for each one, separate harmonic factors $\beta_m$, for each of the m subsystems, and with the sum of the outputs from each NS Controller Subsystems added to the output of the PI Filter to compute $v_{dq}$ in order to target and simultaneously suppress more than one harmonic.

In one embodiment, the present invention discloses a current controller comprising: a positive sequence controller; and a negative sequence controller, where error signals operated on by said positive sequence controller are transformed into a negative sequence reference frame and input to said negative sequence controller.

In another embodiment, the present invention provides a method as implemented in a current controller for higher bandwidth operation based on minimized interference between positive and negative components of a current controller, said method performed without additional filtering on measured currents to isolate positive and negative current components, said method comprising: identifying error signals operated on by a positive sequence controller; transforming identified error signals into a negative sequence reference frame associated with a negative sequence controller; inputting transformed error signals to a negative sequence controller, and where undesirable interactions between said positive sequence controller and negative sequence controller is minimized by sharing error signals.

Figure 2:
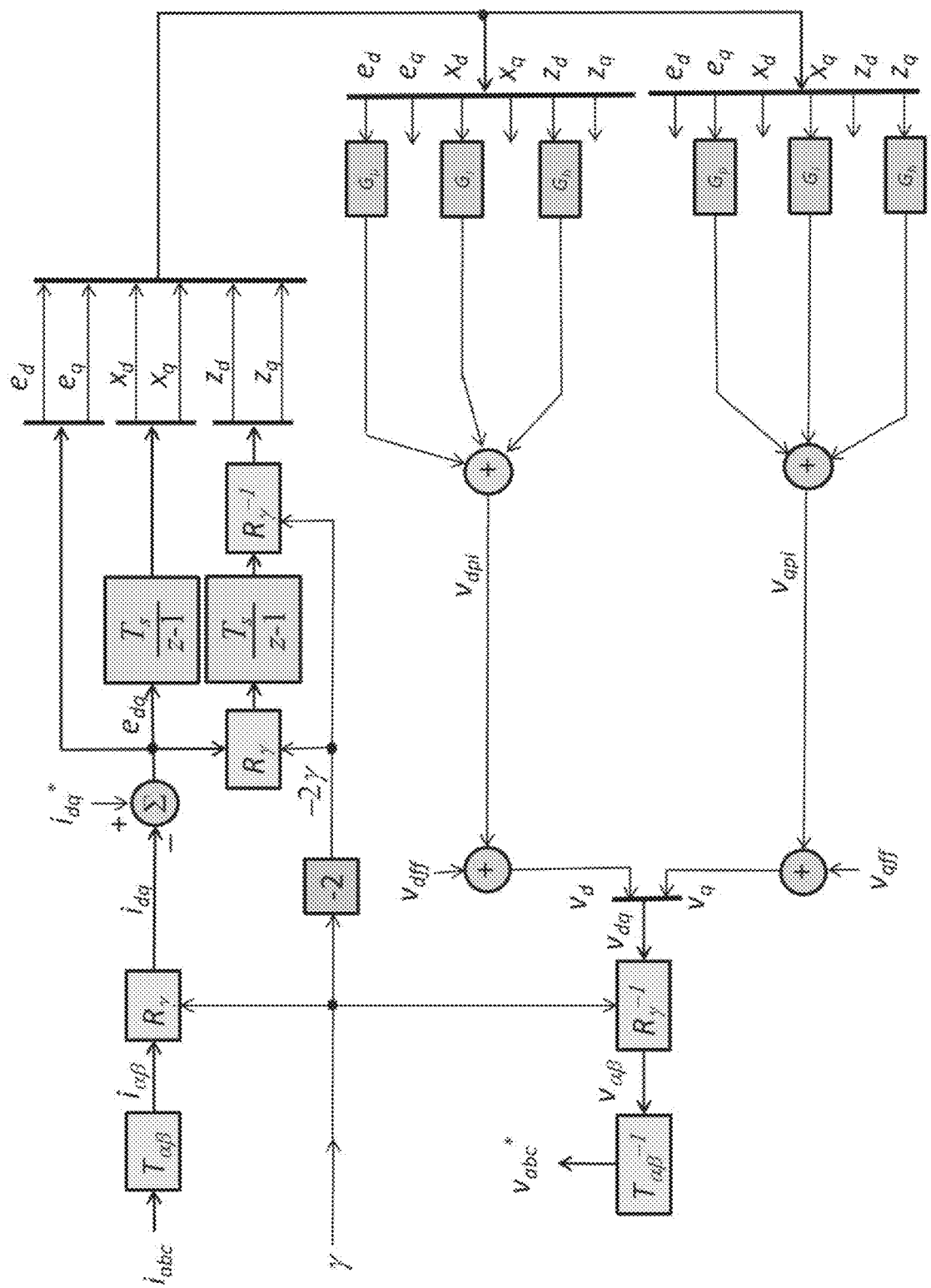
FIG. 2 shows an alternate and extended form of the same NS/PI controller shown in FIG. 1B.

The simpler above approach is good for situations where the required control bandwidth is not too stringent, and there is not too much loop delay in the feedback path. FIG. 2 shows an alternate and extended form of the same NS/PI controller shown in FIG. 1B. This form is preferred for control design and is better for showing additional features that can be incorporated into the structure. FIG. 2 shows a more detailed view of FIG. 1B. Here more detail is provided and a feed forward voltage command is added to provide better transient response, as is often done in these systems. The input 3-phase measured currents $i_{abc}$ are transformed to the stationary 2-phase frame currents $i_{\alpha\beta}$ via the $T_{\alpha\beta}$ transform block. The stationary frame currents are then transformed to the rotating frame $i_{dq}$ currents via the rotation transform block $R_\gamma$, which uses the flux angle γ. The error signal vector $e_{dq}$ is generated by taking the difference between the measured currents and the commanded currents. This figure makes the PI filter function explicit. The error signal is split into 3 paths. In the first path, the error signal vector $e_{dq}$ is multiplied by the proportional gain $G_p$. In the second path, the error signal $e_{dq}$ is integrated by the $T_s/(z-1)$ block and then multiplied by the integral gains $G_i$. In the third path, the error signal is further transformed into the negative sequence frame. The function is to transform the error signal using a rotation transform at −2 times the transform angle γ. In between the to-and-from rotational transforms $R_\gamma$ and $R\gamma^{-1}$ that are fed with the −2γ angle, an integrator block Ts/(z−1) is inserted. After transformation back to the positive dq-frame, the $z_{dq}$ signal is multiplied by the $G_h$ gain. The three paths are added together, as shown, and then a feedforward signal (as typically used in standard practice) is added to form the dq-frame commanded voltage $v_{dq}$. This commanded voltage is transformed to a stationary frame 2-phase voltage $v_{\alpha\beta}$, using the $R_\gamma^{-1}$ transform block with input angle γ. Then, this signal vector is transformed by the $T_{\alpha\beta}^{-1}$ block to form the commanded $v_{abc}$* three-phase voltages.

Figure 3:
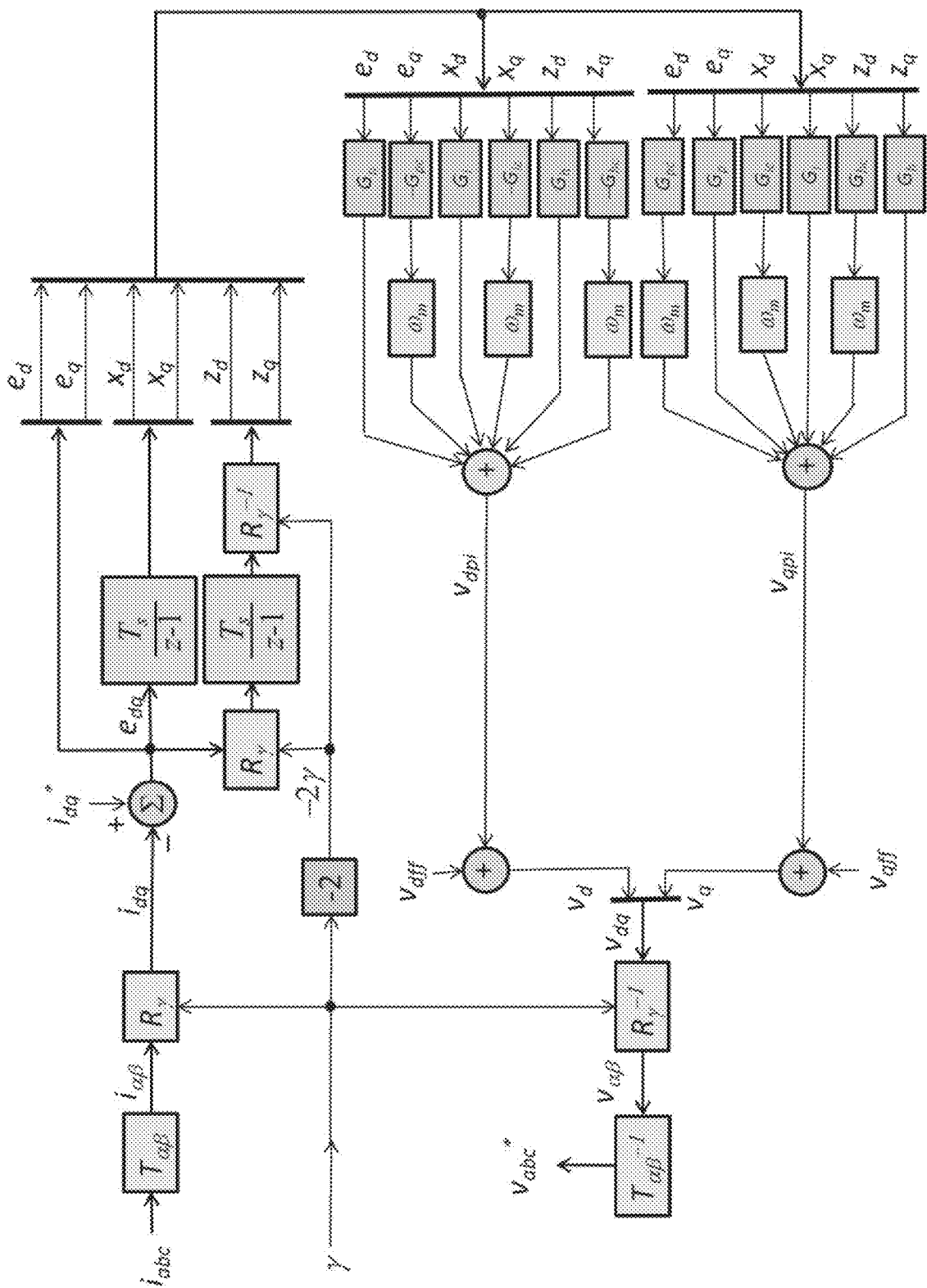
FIG. 3 shows cross coupled gains that are added to a controller.

In more demanding applications where higher bandwidth is desired and the loop delays are not too large, cross coupled gains can be added to the controller as shown in FIG. 3. In general the cross coupled gains could be constant numbers, or can be made functions of motor speed or electrical frequency. The functional form of the speed/frequency dependence can be determined by analysis to place the poles and keep them in the same general spot as speed changes. However, this is complicated and a simplification is to make the cross coupled gains proportional to motor speed, as shown in FIG. 3. FIG. 3 shows an extended block diagram from that in FIG. 2. Here more feedback is provided to create cross coupled gains that allow full pole placement designs to be realized, provided that delays are small. The input 3-phase measured currents $i_{abc}$ are transformed to the stationary 2-phase frame currents $i_{\alpha\beta}$ via the $T_{\alpha\beta}$ transform block. The stationary frame currents are then transformed to the rotating frame $i_{dq}$ currents via the rotation transform $R_\gamma$, which uses the flux angle γ. The error signal vector $e_{dq}$ is generated by taking the difference between the measured currents and the commanded currents. The error signal is split into 3 paths. In the first path, the error signal vector $e_{dq}$ formed and split into separate $e_d$ and $e_q$ components. In the second path, the error signal $e_{dq}$ is integrated by the Ts/(z−1) block to create the $x_{dq}$ vector which is then split into separate $x_d$ and $x_q$ components. In the third path, the error signal is further transformed into the negative sequence frame. The function is to transform the error signal using a rotation transform at −2 times the transform angle γ. In between the to-and-from rotational transforms $R_\gamma$ and $R_\gamma^{-1}$ that are fed with the −2γ angle, an integrator block Ts/(z−1) is inserted. After transformation back to the positive dq-frame, the $z_{dq}$ signal is split into separate $z_d$ and $z_q$ components. The three paths are multiplied by various gain factors and then added together, as shown. The gain multiplications include all of the same $G_p$, $G_i$ and $G_h$ gain multiplications; however, also included are the cross coupled gains which are also scaled by the motor speed to provide adaptive gains. The cross coupled gain signals feeding into the sum junction for $V_{dpi}$ are $-\omega_m G_{pc} e_q$, $-\omega_m G_{ic} x_q$, $-\omega_m G_{hc} x_q$. The cross coupled gain signals feeding into the sum junction for $V_{qpi}$ are $\omega_m G_{pc} e_d$, $\omega_m G_{ic} x_d$, $\omega_m G_{hc} z_d$. Then feedforward signals (as typically used in standard practice) $V_{dff}$ and $V_{qff}$ are added to the $V_{dpi}$ and $V_{qpi}$ voltage channels, respectively, to form the dq-frame commanded voltage $v_{dq}$. This commanded voltage is transformed to a stationary frame 2-phase voltage $v_{\alpha\beta}$, using the transform block fed with angle γ. Then, this signal vector is transformed by the $T_{\alpha\beta}^{-1}$ block to form the commanded $v_{abc}^*$ three-phase voltages.

This disclosure identifies the cross coupled gains (constant or speed dependent) as useful for a solution depending on the required system specification. When the cross coupled gains are made proportional to speed, it is often possible to maintain system stability and good performance without having highly complicated functions.

In another embodiment, the present invention provides a current controller comprising: a positive sequence controller, at least one negative sequence controller, and one or more delay state feedbacks to counter control loop delays, said delay state feedbacks providing high bandwidth, low current overshoot, small current rise time and good current stability margins.

In another embodiment, the present invention provides a method as implemented in a current controller to address a negative sequence control altering a frequency response characteristics of said current controller at high frequency causing reduced gain and phase margins when operating a motor at high speed, said current controller comprising a positive sequence controller and at least one negative sequence controller, said method comprising: identifying control loop delays in said current controller; and providing one or more delay state feedback to counter control loop delays, said delay state feedback providing high bandwidth, low current overshoot, small current rise time and good current stability margins.

In another embodiment, the present invention provides a current controller comprising: a positive sequence controller, at least one negative sequence controller, and one or more cross coupled gains between a d-axis and a q-axis, said cross coupled gains proportional to speed of a motor associated with said current controller. In an extended embodiment, the gains can be a general scaled function of speed in order for the design to work over an entire operating speed of said motor.

In another embodiment, the present invention provides a method as implemented in a current controller associated with a motor, said current controller comprising a positive sequence controller and at least one negative sequence controller, said method comprising: identifying a speed of said motor; and providing one or more cross coupled gains between a d-axis and a q-axis, said cross coupled gains proportional to said identified speed of said motor. In an extended embodiment, the gains can be a general scaled function of speed in order for the design to work over an entire operating speed of said motor.

In another embodiment, the present invention provides a current controller comprising: a positive sequence controller, at least one negative sequence controller, one or more delay state feedback to counter control loop delays, said delay state feedback providing high bandwidth, low current overshoot, small current rise time and good current stability margins; and one or more cross coupled gains between a d-axis and a q-axis, said cross coupled gains proportional to speed of a motor associated with said current controller. In an extended embodiment, the gains can be a general scaled function of speed in order for the design to work over an entire operating speed of said motor.

In another embodiment, the present invention provides a method as implemented in a current controller associated with a motor, said current controller comprising a positive sequence controller and at least one negative sequence controller, said method comprising: identifying a speed of said motor; providing one or more delay state feedback to counter control loop delays, said delay state feedback providing high bandwidth, low current overshoot, small current rise time and good current stability margins; and providing one or more cross coupled gains between a d-axis and a q-axis, said cross coupled gains proportional to said identified speed of said motor. In an extended embodiment, the gains can be a general scaled function of speed in order for the design to work over an entire operating speed of said motor.

Figure 4:
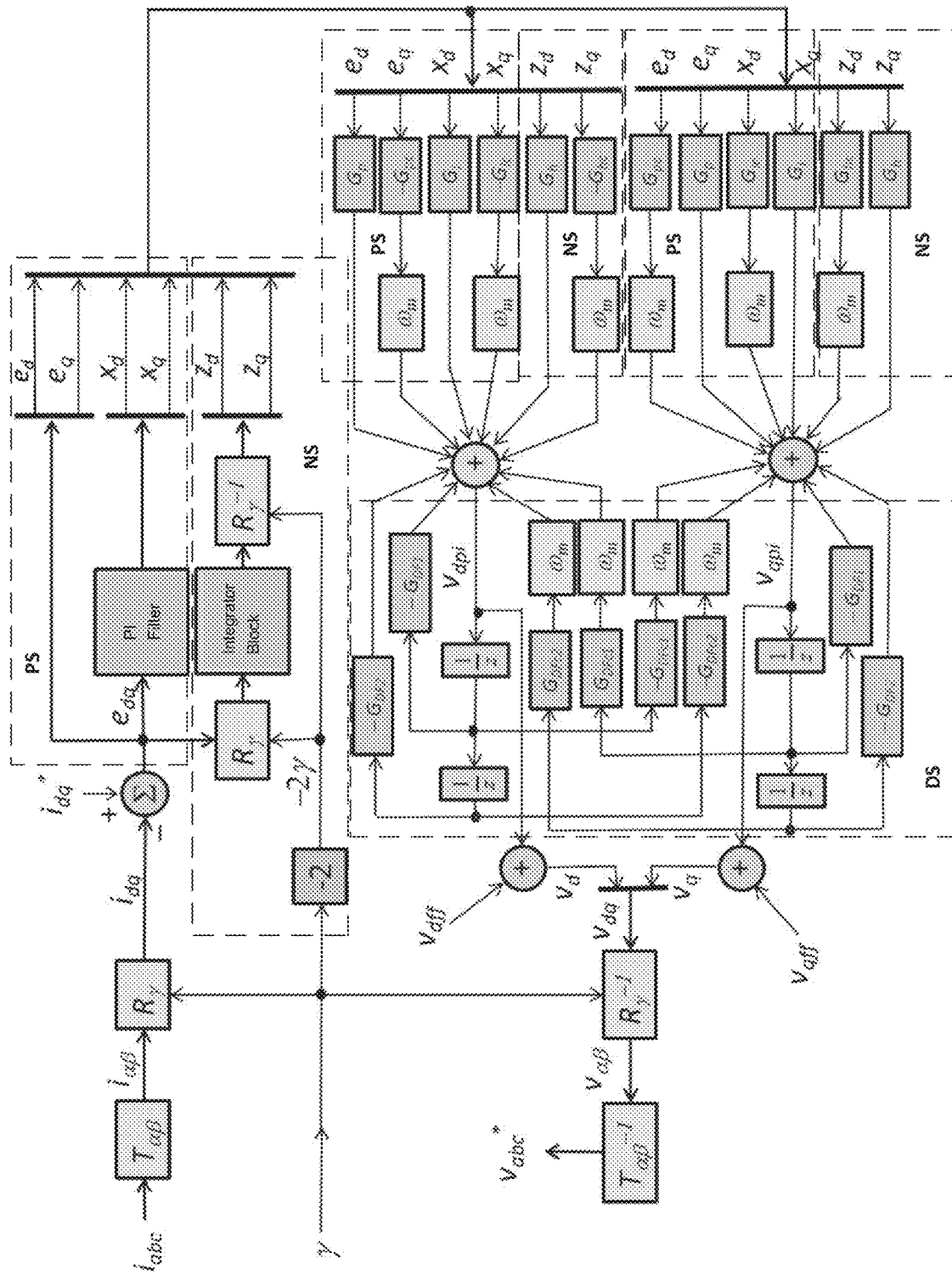
FIG. 4 shows a block diagram for the NS/PI vector current control system with both speed dependent cross coupling feedback and delay state feedback.

The block diagram for the NS/PI vector current control system in its most advanced form, with both speed dependent cross coupling feedback and delay state feedback, is shown in FIG. 4. FIG. 4 shows an extended block diagram from that in FIG. 3. Here more feedback is provided to create delay state gains that allow full pole placement designs to be realized, when delays can't be neglected. The input 3-phase measured currents $i_{abc}$ are transformed to the stationary 2-phase frame currents $i_{\alpha\beta}$ via the $T_{\alpha\beta}$ transform block. The stationary frame currents are then transformed to the rotating frame $i_{dq}$ currents via the rotation transform $R_\gamma$, which uses the flux angle γ. The error signal vector $e_{dq}$ is generated by taking the difference between the measured currents and the commanded currents. The error signal is split into 3 paths. In the first path, the error signal vector $e_{dq}$ formed and split into separate $e_d$ and $e_q$ components. In the second path, the error signal $e_{dq}$ is integrated by the Ts/(z−1) block to create the $x_{dq}$ vector which is then split into separate $x_d$ and $x_q$ components. In the third path, the error signal is further transformed into the negative sequence frame. The function is to transform the error signal using a rotation transform at −2 times the transform angle γ. In between the to-and-from rotational transforms $R_\gamma$ and $R\gamma^{-1}$ that are fed with the −2γ angle, an integrator block Ts/(z−1) is inserted. After transformation back to the positive dq-frame, the $z_{dq}$ signal is split into separate $z_d$ and $z_q$ components. The three paths are multiplied by various gain factors and then added together, as shown. The gain multiplications include all of the same $G_p$, $G_i$ and $G_h$ gain multiplications; and also included are the cross coupled gains which are also scaled by the motor speed to provide adaptive gains. Additionally, the delay states are implemented in the block diagram and then delay state gains, and cross coupled gains (also scaled by motor speed) are added. The cross coupled gain signals feeding into the sum junction for $V_{dpi}$ are $-\omega_m G_{pc} e_q$, $-\omega_m G_{ic} x_q$, $-\omega_m G_{hc} x_q$, $\omega_m G_{DFc1} V_{qpi1}$, and $\omega_m G_{DFc2} V_{qpi2}$, where $V_{qpi1}$ and $V_{qpi2}$ are the first and second delay states of $V_{qpi}$. The cross coupled gain signals feeding into the sum junction for $V_{qpi}$ are $\omega_m G_{pc} e_d$, $\omega_m G_{ic} d$, $\omega_m G_{hc} z_d$, $-\omega_m G_{DFc1} V_{dpi1}$, and $-\omega_m G_{DFc2} V_{dpi2}$, where $V_{dpi1}$ and $V_{dpi2}$ are the first and second delay states of $V_{dpi}$. Then feedforward signals (as typically used in standard practice) $V_{dff}$ and $V_{qff}$ are added to the $V_{dpi}$ and $V_{qpi}$ voltage channels, respectively, to form the dq-frame commanded voltage $v_{dq}$. This commanded voltage is transformed to a stationary frame 2-phase voltage $v_{\alpha\beta}$, using the $R_\gamma^{-1}$ transform block fed with angle γ. Then, this signal vector is transformed by the $T_{\alpha\beta}^{-1}$ block to form the commanded $v_{abc}^*$ three-phase voltages.

For illustration purposes, the presentation assumes two loop delay states. However, the method is general to any arbitrary number of delay states. Also, the harmonic factor $\beta=-2$ is shown for illustration, but any other integer value or values for $\beta$ could be chosen. If it is desirable to simultaneously suppress multiple harmonics, then multiple values of $\beta$ can be used in a block parallel implementation of the controller to achieve suppression for each harmonic. The blocks are shown for the control gains. These are indicating that the cross coupled gains are multiplied by the motor speed $\omega_m$. The transform blocks are showing the matrix operator transforms that operate on the signal vectors, and the z-dependent blocks are showing digital delays (1/z) and digital integration blocks ($T_s/(z-1)$).

The following formulas provide the algorithm explicitly, and these formulas are general enough to implement any of the controller forms discussed above. In the simpler cases, the respective gains that are not needed are simply set to zero.

$$i_{\alpha\beta}[n] = T_{\alpha\beta} \cdot i_{abc}[n]$$

$$i_d[n] = \cos(\gamma) \cdot i_\alpha[n] + \sin(\gamma) \cdot i_\beta[n]$$

$$i_q[n] = \cos(\gamma) \cdot i_\beta[n] - \sin(\gamma) \cdot i_\alpha[n]$$

$$e_d[n] = i_d^*[n] - i_d[n]$$

$$e_q[n] = i_q^*[n] - i_q[n]$$

$$x_d[n+1] = x_d[n] + T_s \cdot e_d[n]$$

$$x_q[n+1] = x_q[n] + T_s \cdot e_q[n]$$

$$e_{d2}[n] = \cos(-2\gamma) \cdot e_d[n] + \sin(-2\gamma) \cdot e_q[n]$$

$$e_{q2}[n] = \cos(-2\gamma) \cdot e_q[n] - \sin(-2\gamma) \cdot e_d[n]$$

$$z_{d2}[n+1] = z_{d2}[n] + T_s \cdot e_{d2}[n]$$

$$z_d[n] = \cos(-2\gamma) \cdot z_{d2}[n] - \sin(-2\gamma) \cdot z_{q2}[n]$$

$$z_q[n] = \cos(-2\gamma) \cdot z_{q2}[n] + \sin(-2\gamma) \cdot z_{d2}[n]$$

$$v_{dpi}[n] = G_p \cdot e_d[n] - \omega_m[n] \cdot G_{pc} \cdot e_q[n] + G_i \cdot x_d[n] - $$
$$\omega_m[n] \cdot G_{ic} \cdot x_q[n] + G_h \cdot z_d[n] - \omega_m[n] \cdot G_{hc} \cdot z_q[n] - $$
$$G_{DF1} \cdot v_{dpi}[n-1] + \omega_m[n] \cdot G_{DFc1} \cdot v_{qpi}[n-1] - $$
$$G_{DF2} \cdot v_{dpi}[n-2] + \omega_m[n] \cdot G_{DFc2} \cdot v_{qpi}[n-2]$$

$$v_{qpi}[n] = G_p \cdot e_q[n] + \omega_m[n] \cdot G_{pc} \cdot e_d[n] + G_i \cdot x_q[n] + $$
$$\omega_m[n] \cdot G_{ic} \cdot x_d[n] + G_h \cdot z_q[n] + \omega_m[n] \cdot G_{hc} \cdot z_d[n] - $$
$$G_{DF1} \cdot v_{qpi}[n-1] - \omega_m[n] \cdot G_{DFc1} \cdot v_{dpi}[n-1] - $$
$$G_{DF2} \cdot v_{qpi}[n-2] - \omega_m[n] \cdot G_{DFc2} \cdot v_{dpi}[n-2]$$

$$v_{dff}[n] = R_s \cdot i_d^*[n] - \omega_e[n] \cdot \left(L_s - \frac{L_m^2}{L_r}\right) \cdot i_q^*[n]$$

$$v_{qff}[n] = R_s \cdot i_q^*[n] + \omega_e[n] \cdot L_s \cdot i_d^*[n]$$

$$v_d[n] = v_{dpi}[n] + v_{dff}[n]$$

$$v_q[n] = v_{qpi}[n] + v_{qff}[n]$$

$$v\alpha[n] = \cos(\gamma) \cdot v_d[n] - \sin(\gamma) \cdot v_q[n]$$

$$v\beta[n] = \cos(\gamma) \cdot v_q[n] + \sin(\gamma) \cdot v_d[n]$$

$$i_{abc}[n] = T_{\alpha\beta}^{-1} \cdot v_{\alpha\beta}[n]$$

Often, negative sequence harmonics are small when the motor speed is small. Hence, optionally, the NS portion of the controller can be turned off below a particular motor speed threshold. This is accomplished by forcing the z-integrators to zero and resetting the x-integrators, whenever speed is below the speed threshold. Off conditions for the z-integrators are always zero and the values of z-integrators must be transferred to the $x_d$ and $x_q$ integrators according to the following formulas. Optionally, a hysteresis-based threshold (dual value) could be used for on the speed threshold, but the simple (single-valued) threshold is inherently noise resistant in this case, hence it may not provide any noticeable difference in performance.

$$x_d[n+1] = x_d[n] + \frac{1}{G_i} \cdot (G_h \cdot z_d - \omega_m \cdot G_{hc} \cdot z_q)$$

$$x_q[n+1] = x_q[n] + \frac{1}{G_i} \cdot (G_h \cdot z_q + \omega_m \cdot G_{hc} \cdot z_d)$$

The NS/PI controller outlined above was implemented on a digital control system and applied to a 1 horsepower, 3 phase induction motor with a 22% inductance imbalance added to one phase leg to demonstrate its effectiveness, although its use in not restricted to a particular power or size level. Successful suppression of the undesirable harmonic was realized while still maintaining high bandwidth operation.

Symbol Definitions

The following definitions and conventions are used in this document.

| Symbol | Description | |
|---|---|---|
| $T_s$ | digital sample time | |
| $N_{pp}$ | number of pole pairs | |
| $L_m$ | mutual inductance | |
| $L_{lr}$ | rotor leakage inductance | |
| $L_{ls}$ | stator leakage inductance | |
| $R_r$ | rotor resistance | |
| $R_s$ | stator resistance | |
| $L_r$ | rotor inductance | $L_r = L_m + L_{lr}$ |
| $L_s$ | stator inductance | $L_s = L_m + L_{ls}$ |
| $G_p$ | proportional gain [V/A] | $G_p$ |
| $G_{pc}$ | proportional cross gain [V/A] | $G_{pc}$ |
| $G_i$ | first integral gain [V/As] | $G_i$ |
| $G_{ic}$ | first integral cross gain [V/As] | $G_{ic}$ |
| $G_h$ | second integral gain [V/As] | $G_h$ |
| $G_{hc}$ | second integral cross gain [V/As] | $G_{hc}$ |
| $G_{DF1}$ | delay gain for delay 1 | $G_{DF}$ |
| $G_{DF2}$ | delay gain for delay 2 | $G_{DF}$ |
| $G_{DFc1}$ | delay cross gain for delay 1 | $G_{DFc}$ |
| $G_{DFc2}$ | delay cross gain for delay 2 | $G_{DFc}$ |
| $i_d^*, i_q^*$ | commanded dq-frame currents | [A] |
| $i_d, i_q$ | measured rotating dq-frame currents | [A] |
| $i_a, i_b, i_c$ | measured abc-frame currents | [A] |
| $i_\alpha, i_\beta$ | measured stationary dq-frame currents | [A] |
| $e_d, e_q$ | dq-frame current errors (positive frame) | [A] |
| $e_{d2}, e_{q2}$ | dq-frame current errors (negative frame) | [A] |
| $v_d, v_q$ | commanded dq-frame voltages | [V] |
| $v_{dff}, v_{qff}$ | feed-forward portion of dq-frame voltages | [V] |
| $v_{dpi}, v_{qpi}$ | feedback portion of dq-frame voltages | [V] |
| $v_\alpha, v_\beta$ | commanded stationary dq-frame voltages | [V] |
| $v_a, v_b, v_c$ | commanded abc-frame voltages | [V] |
| $x_d, x_q$ | PI dq-frame integral states | [As] |
| $z_{d2}, z_{q2}$ | NS dq-frame integral states (negative frame) | [As] |
| $z_d, z_q$ | NS dq-frame integral states (positive frame) | [As] |
| $\omega_m$ | estimated mechanical rotor speed | [rad/s] |
| $\gamma$ | estimated electrical synchronous angle | [rad] |
| $\omega_e$ | estimated electrical synchronous frequency | [rad/s] |
| VP1 | P1 dq-frame P1 filter output voltages | [V] |
| VHS | NS controller subsystem output voltage | [V] |
| $\beta$ | harmonic factor | [no units] |
| n | discrete time | [no units] |

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

CONCLUSION

A system and method has been shown in the above embodiments for the effective implementation of a design for electric motor current controller with negative sequence harmonic suppression. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A current controller comprising:
a positive sequence controller; and
at least one negative sequence controller,
wherein one or more error signals operated on by the positive sequence controller are transformed into at least one sequence reference frame and input to the at least one negative sequence controller with at least one targeted harmonic set by a harmonic factor value.

2. The current controller of claim 1, wherein the current controller is for a motor or power system.

3. The current controller of claim 2, wherein the motor is any of the following: a linear and rotary electric motor or an induction motor.

4. The current controller of claim 3, wherein the current controller further comprises one or more cross coupled gains between a d-axis and a q-axis, the cross coupled gains proportional to speed of the motor.

5. The current controller of claim 1, wherein the current controller further comprises a rotational transformer, the rotational transformer transforming the one or more error signals to the at least one sequence reference frame for input to the at least one negative sequence controller.

6. The current controller of claim 1, wherein the one or more error signals are computed by taking a difference between measured and commanded currents.

7. The current controller of claim 1, wherein the harmonic factor is picked to suppress a positive or negative sequence harmonic caused by phase imbalance.

8. A current controller comprising:
a positive sequence controller;
at least one negative sequence controller;
a rotational transformer, and
wherein the rotational transformer transforms one or more error signals operated on by the positive sequence controller into at least one sequence reference frame for input to the at least one negative sequence controller with at least one targeted harmonic set by a harmonic factor value.

9. The current controller of claim 8, where the current controller is for a motor or power system.

10. The current controller of claim 9, where the motor is any of the following: a linear and rotary electric motor or an induction motor.

11. The current controller of claim 10, wherein the current controller further comprises one or more cross coupled gains between a d-axis and a q-axis, the cross coupled gains proportional to speed of the motor.

12. The current controller of claim 8, wherein the one or more error signals are computed by taking a difference between measured and commanded currents.

13. The current controller of claim 8, wherein the harmonic factor is picked to suppress a positive or negative sequence harmonic caused by phase imbalance.

14. A current controller comprising:
a positive sequence controller;
at least one negative sequence controller;
a rotational transformer, and
wherein one or more error signals computed by taking a difference between measured and commanded currents are shared between the positive sequence controller and the at least one negative sequence controller, and wherein the rotational transformer transforms the one or more error signals operated on by the positive sequence controller into at least one sequence reference frame for input to the at least one negative sequence controller with at least one targeted harmonic set by a harmonic factor value.

15. The current controller of claim 14, where the current controller is for a motor or power system.

16. The current controller of claim 15, where the motor is any of the following: a linear and rotary electric motor or an induction motor.

17. The current controller of claim 16, wherein the current controller further comprises one or more cross coupled gains between a d-axis and a q-axis, the cross coupled gains proportional to speed of the motor.

18. The current controller of claim 14, wherein the one or more error signals are computed by taking a difference between measured and commanded currents.

19. The current controller of claim 14, wherein the harmonic factor is picked to suppress a positive or negative sequence harmonic caused by phase imbalance.

20. A current controller for a motor, the motor is any of the following: a linear and rotary electric motor or an induction motor, the current controller comprising:
a positive sequence controller;
at least one negative sequence controller;
a rotational transformer; and
one or more cross coupled gains between a d-axis and a q-axis, the cross coupled gains proportional to speed of the motor;
wherein one or more error signals computed by taking a difference between measured and commanded currents are shared between the positive sequence controller and the at least one negative sequence controller, and wherein the rotational transformer transforms the one or more error signals operated on by the positive sequence controller into at least one sequence reference frame for input to the at least one negative sequence controller with at least one targeted harmonic set by a harmonic factor value.

21. The current controller of claim 19, wherein the harmonic factor is picked to suppress a positive or negative sequence harmonic caused by phase imbalance.

\* \* \* \* \*